United States Patent [19]

Vollmayr

[11] Patent Number: 5,353,232
[45] Date of Patent: Oct. 4, 1994

[54] METHOD AND APPARATUS FOR ASCERTAINING TOOL PATH CONTOURS IN NUMERICALLY CONTROLLED MACHINES

[75] Inventor: Norbert Vollmayr, Traunwalchen, Fed. Rep. of Germany

[73] Assignee: Dr. Johannes Heidenhain GmbH, Traunreut, Fed. Rep. of Germany

[21] Appl. No.: 765,377

[22] Filed: Sep. 25, 1991

[30] Foreign Application Priority Data

Sep. 25, 1990 [EP] European Pat. Off. ........ 90118383.0

[51] Int. Cl.$^5$ .......................................... G06F 15/46
[52] U.S. Cl. ........................... 364/474.29; 364/474.28
[58] Field of Search ................. 364/474.28–474.33, 364/578

[56] References Cited

U.S. PATENT DOCUMENTS

| | | | |
|---|---|---|---|
| 3,629,558 | 12/1971 | Coggin | 235/151.1 |
| 3,927,948 | 12/1975 | Cox et al. | 356/167 |
| 4,127,849 | 11/1978 | Okor | 340/324 AD |
| 4,162,527 | 7/1979 | Kilbane et al. | 364/474 |
| 4,275,449 | 6/1981 | Aish | 364/512 |
| 4,503,493 | 3/1985 | Burkhardt et al. | 364/170 |
| 4,536,848 | 8/1985 | d'Entremont et al. | 364/526 |
| 4,551,810 | 11/1985 | Levine | 364/475 |
| 4,575,791 | 3/1986 | Schwefel | 364/168 |
| 4,586,145 | 4/1986 | Bracewell et al. | 364/512 |
| 4,618,924 | 10/1986 | Hinds | 364/191 |
| 4,706,200 | 11/1987 | Kishi et al. | 364/474 |
| 4,757,461 | 7/1988 | Stöhr et al. | 364/518 |
| 4,791,579 | 12/1988 | Kranitzky | 364/518 |
| 4,792,889 | 12/1988 | Krägelin et al. | 364/191 |
| 4,833,617 | 5/1989 | Wang | 364/474.15 |
| 4,837,703 | 6/1989 | Kakazu et al. | 364/474.18 |
| 4,868,761 | 9/1989 | Hayashi | 364/474 |
| 4,870,597 | 9/1989 | Seki et al. | 364/474 |
| 4,879,667 | 11/1989 | Gorski et al. | 364/522 |
| 5,101,363 | 3/1992 | Rutkowski | 364/578 |
| 5,295,075 | 3/1994 | Korner et al. | 364/474.28 |

FOREIGN PATENT DOCUMENTS

| | | |
|---|---|---|
| 0083836 | 11/1982 | European Pat. Off. . |
| 0117614 | 1/1984 | European Pat. Off. . |
| 0121100 | 1/1984 | European Pat. Off. . |
| 0144585 | 9/1984 | European Pat. Off. . |
| 0145967 | 6/1985 | European Pat. Off. . |
| 3401060 | 1/1986 | Fed. Rep. of Germany . |
| 7130870 | 4/1972 | France . |
| 2140937 | 12/1984 | United Kingdom . |

OTHER PUBLICATIONS

Sungurtekin et al., "Graphical Simulation & Automatic Verification of NC Machining Programs," *1986 Proceedings IEEE International Conference on Robotics and Automation*, vol. 1, pp. 156–165.

Wang et al.; Geometric Modeling for Swept Volume of Moving Solids; Dec., 1986, pp. 8–17, IEEE CG & A.

Proceedings of the 1966 IEEE International Conference on Robotics and Automation, vol. 1, Apr. 1986, New York U.S., pp. 156–165; Sungurtekin & Voelcker; "Graphical Simulation and Automatic Verification of NC Machine Programs."

General Electric Technical Information Series, May 1984, W. Wang, "Solid Geometric Modeling for Mold Design and Manufacture," pp. 1–30.

The Polygon Package, E. E. Barton and I. Buchanan, vol. 12, No. 1, Jan. 1980.

Pioneering in Technology, Proceedings 17th Numerical Control Society Annual Meeting and Technical Conference, Apr. 27, 1980.

*Primary Examiner*—Jerry Smith
*Assistant Examiner*—Jim Trammell
*Attorney, Agent, or Firm*—Willian Brinks Hofer Gilson & Lione

[57] ABSTRACT

With the method and apparatus for machining workpieces according to FIG. 2, the boundary contours of a workpiece (12) are ascertained with the aid of peripheral points (e2, e3; f2, f3; g2, g3; h2, h3), which are obtained by set theory intersection point observations. To this end, a network of auxiliary lines (e, f, g, h) is placed via an intersection line of the surface of the workpiece with a current layer (machining plane), which are linked with the contour of the intersection line (12) in accordance with so-called Boolean rules.

18 Claims, 2 Drawing Sheets

METHOD AND APPARATUS FOR ASCERTAINING TOOL PATH CONTOURS IN NUMERICALLY CONTROLLED MACHINES

REFERENCE TO RELATED APPLICATIONS

The disclosures of the following copending applications assigned to the assignee of the present application and filed concurrently herewith are specifically incorporated by reference:

"Method and Apparatus for Ascertaining Tool Path Contours Approximating Curved Contour Intersection Lines in Numerically Controlled Machines", by Klaus-Dieter Körner U.S. Ser. No. 07/765,127; (Attorney Docket No. 56/232) pending; and "Method and Apparatus for Machining Workpieces with Numerically Controlled Machines", by Klaus-Dieter Körner U.S. Ser. No. 07/765,562; (Attorney Docket No. 56/234) U.S. Pat. No. 5.295,075.

BACKGROUND OF THE INVENTION

1. Field of the Invention

The invention relates to a method and apparatus for ascertaining tool path contours by means of numerically controlled machines, and particularly to tool path contours created from corrected base bodies united to form a corrected workpiece and to tool paths machining workpieces involving staggered depth layers.

2. Description of the Prior Art

In numerically controlled (NC) machine tools, data is determined for producing a workpiece from a workpiece blank in the form of tool path data by means of an NC program. This requires correcting the contour of the workpiece to be produced with the tool radius, since it is not the workpiece contour but rather the center point of the tool path that is relevant to the machine in producing the workpiece.

For NC control, calculating the corrected sectional contour of a given body is a complex task requiring a great deal of calculation. Difficulties reside in defining a complex body and its surface and in calculating an equal distance for the cutter radius correction, taking possible collisions into account with a given accuracy. The amount of computer capacity and memory capacity needed is correspondingly high. To perform such calculations, additional hardware and software are necessary on the NC control computer. These include special arithmetic processors, for instance, as well as geometric methods and display methods for describing free-form surfaces.

It is known that relatively complex body contours can be constructed from simple contour parts such as circles and rectilinear lines. The tool radius corrections can be carried out easily with these simple contours, however, it becomes problematic to ascertain the resultant tool path from the various corrected contours constructed to form the complex body, since overlapping occurs when the various corrected contours are put together. Specifically, the tool path contours determined by the corrected path data do not necessarily coincide with the intersection lines of the assembled contour parts.

Accordingly, an object of the invention is to ascertain the allowable peripheral points for an arbitrarily composed contour, the sequence of which points corresponds to the tool path that the contour of the workpiece generates.

The advantages of this method and apparatus are that for a complex contour, the necessary cutter path data can be obtained in a simple manner from the ascertained allowable peripheral points.

Further objects and advantages will become apparent from the following description and the accompanying drawings.

SUMMARY OF THE INVENTION

BRIEF DESCRIPTION OF THE DRAWINGS

Further objects and advantages of this invention will become more apparent and readily appreciated from the following detailed description of the present invention, taken in conjunction with the accompanying drawings, of which.

DETAILED DESCRIPTION OF THE PREFERRED EMBODIMENTS

To simplify ascertaining the tool path contours or the path data thereof, a cutter path correction is performed using a simple two-dimensional (2-D) contour. This tool path contour forms a corrected 2-D contour. The corrected 2-D contour is shifted along a vector, for instance translationally, and in this way a corrected 3-D article is formed. The surfaces of a corrected body describe areas equidistant from the surfaces of the basic body.

Assembly of the desired body for the workpiece to be produced is done using the already-corrected bodies so that the tool path contours coincide with the intersecting lines of a complete body that has been put together and has already been corrected.

The intersecting lines between the corrected surfaces and the applicable machining plane are now calculated. The intersecting lines are rectilinear segments for bodies generated by translation or the lines are curves of generally conical or cylindrical sections for bodies generated by rotation. For instance, U.S. Pat. No. 4,868,761 (Hayashi), which corresponds to German Published, Non-Examined Patent Application 36 08 438, discloses a method of calculating free, curved edges for manufacture by means of numerically controlled machines by means of computer-aided design (CAD) and computer-aided manufacture (CAM). In addition, set theory, also known as Boolean operation, is used to combine simple mathematically definable bodies to form a complex body. The function of defining a shape described in this reference, however, is completely separate from the function of determining the geometric location of a tool. The latter is the task of numerical control.

The separation of defining the shape and determining the location of the tool is understandable, from the contents of this patent and from the knowledge of those skilled in the art, because the calculation of free surfaces, which can be mathematically determined only with extreme difficulty, exceeds the capabilities of numerical control in practice.

Figure 1:
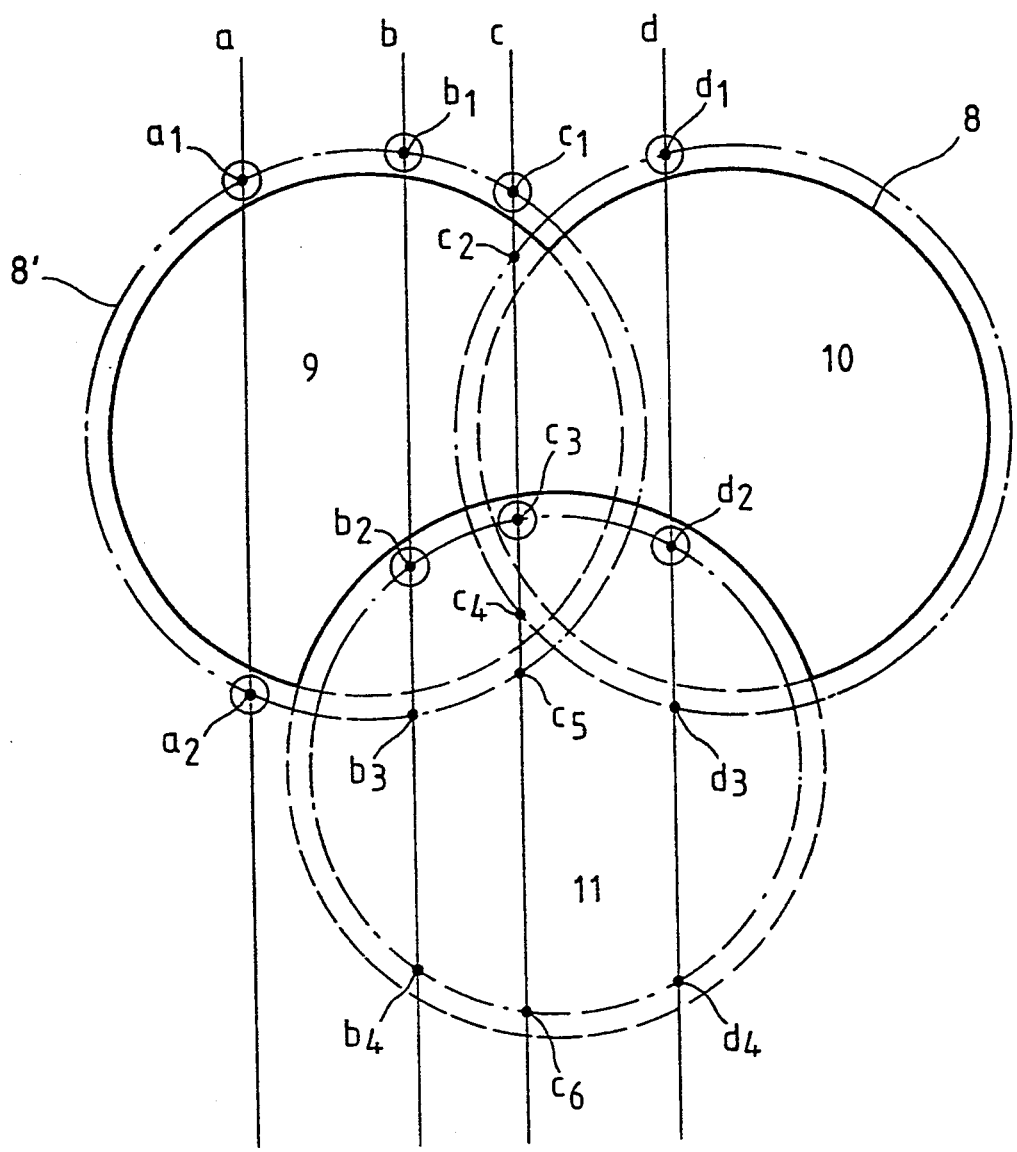
FIG. 1 is a plan view of a milling cutter path.

In FIG. 1, a plan view of a workpiece 8 and its correcting body 8' is shown. The workpiece 8 comprises three basic bodies in the form of cylinders. The ascertainment of valid peripheral points on the workpiece 8 is determined by performing set theory operations, also known as Boolean operations. Copending application, "Method and Apparatus for Machining Workpieces with Numerically Controlled Machines" by Klaus-Dieter Körner U.S. Pat. No. 5,295,075, mentioned above, describes the formation of complex bodies, such as workpiece 8 and corrected workpiece 8, by set theory operations performed on base bodies. The plan view illustrates an intersection contour line between the surface of the workpiece 8 and the applicable machining plane. In addition, the intersection contour line of the corrected workpiece 8' and the applicable machining plane are shown. The tool path contour coincides with the intersection contour line of the corrected body 8'. The cylinders used to create workpiece 8 are identified by reference numerals 9, 10 and 11. Cylinders 9 and 10 represent positive cylinders to be summed together while cylinder 11 is a negative cylinder which must be subtracted from the sum of cylinders 9 and 10 in composing the workpiece 8.

To produce workpiece 8, cylinders 9, 10 and 11 are corrected and linked by set-theory algebra to ascertain the corrected cutter path data. In order to generate the corrected base bodies cylinders, it must first be determined whether the applicable base body is a positive body or a negative body. In FIG. 1, the positive cylinders 9 and 10 have corrected contours having a radius greater than the radius of the cylinders 9 and 10. For negative cylinder 11, the corrected contour has a smaller radius than the radius of cylinder 11. By set theory algebraic operations, the valid peripheral points for the cutter paths are ascertained as will be described below.

To ascertain the valid peripheral points, auxiliary lines are placed in a particular matrix over the corrected body 8. Only four auxiliary lines a-d have been shown, however, the location of the auxiliary lines is arbitrary and the auxiliary lines should be located close together in order to form a continuously extending cutter path. The sequence of valid peripheral points corresponds to the cutter path that generates the contour of the workpiece 8.

The basic condition of the set operation involved for the three cylinders is the union of cylinders 9 and 10 from which the cylinder 11 is subtracted. The set operation is represented by the equation:

$$(9 \cup 10) \ 11.$$

The determination of valid or not valid peripheral points is always determined using the contours of the corrected bodies 9, 10 and 11.

The first step in performing the operation $(9 \cup 10)/11$ is to determine the location of a point in the union of cylinders 9 and 10, i.e. $9 \cup 10$. The second step is to determine whether the point resulting from the union of cylinders 9 and 10 is a valid point located on the periphery of body resulting from the difference between cylinder 11 and the union of cylinders 9 and 10. A valid point resulting from the second step will be a point located on the periphery of the resulting body.

The following symbols and their definitions are used in the tables:

$R_i$ = peripheral point located on cylinder i
$I_i$ = point located inside cylinder i
$A_i$ = point located outside cylinder i
$R_{(9 \cup 10)}$ = peripheral point located on union of cylinders 9 and 10

$I_{(9 \cup 10)}$ = point located inside the union of cylinders 9 and 10
$A_{(9 \cup 10)}$ = point located outside the union of cylinders 9 and 10
$Ⓡ_{((9 \cup 10)\ 11)}$ = valid peripheral point of resultant body defined by equation $(9 \cup 10)\ 11$
$I_{((9 \cup 10)\ 11)}$ = point located inside the resultant body
$A_{((9 \cup 10)\ 11)}$ = point located outside the resultant body.

Auxiliary line "a" intersects the corrected cylinder 9 at point $a_1$. The point $a_1$ is the peripheral point of cylinder 9, ($R_9$), and is located outside of cylinder 10, ($A_{10}$), thus, $a_1$ is a peripheral point of the union set $9 \cup 10$, ($R_{9 \cup 10}$). Point $a_1$ is also located outside of cylinder 11, ($A_{11}$), and accordingly, $a_1$ is a valid peripheral point for the differential quantity $(9 \cup 10)\ 11$ as well.

Expressed in table form:

| location of the point on corrected bodies | location of the point on resultant body |
|---|---|
| $a_1 = R_9; A_{10}$ | $R_{(9 \cup 10)}$ |
| $a_1 = R_{(9 \cup 10)}; A_{11}$ | $Ⓡ_{((9 \cup 10)\ 11)}$ |
| $a_2 = R_9; A_{10}$ | $R_{(9 \cup 10)}$ |
| $a_2 = R_{(9 \cup 10)}; A_{11}$ | $Ⓡ_{((9 \cup 10)\ 11)}$ |

Both intersection points $a_1$ and $a_2$ are accordingly valid peripheral points, which the cutter may drive up against. Valid peripheral points are identified in the tables and in FIG. 1 with a concentric circle around the applicable point which is intended to represent a spherical cutter.

Analogously, for an auxiliary line b, the following applies:

| location of a point on corrected bodies | location of a point on resultant body |
|---|---|
| $b_1 = R_9; A_{10}$ | $R_{(9 \cup 10)}$ |
| $b_1 = R_{(9 \cup 10)}; A_{11}$ | $Ⓡ_{((9 \cup 10)\ 11)}$ |
| $b_2 = I_9; A_{10}$ | $I_{(9 \cup 10)}$ |
| $b_2 = R_{11}; I_{(9 \cup 10)}$ | $Ⓡ_{(11\ (9 \cup 10))}$ |
| $b_3 = R_9; A_{10}$ | $R_{(9 \cup 10)}$ |
| $b_3 = R_{(9 \cup 10)}; I_{11}$ | $I_{(11\ (9 \cup 10))}$ |

Since point $b_3$ is not valid for all conditions, it does not represent a valid peripheral point for machining.

| location of a point on corrected bodies | location of a point on resultant body |
|---|---|
| $b_4 = A_9; A_{10}$ | $A_{(9 \cup 10)}$ |
| $b_4 = R_{11}; A_{(9 \cup 10)}$ | $A_{((9 \cup 10)\ 11)}$ |

Accordingly, in auxiliary line b, only the peripheral points $b_1$ and $b_2$ are valid cutter path points.

For auxiliary line c, the following applies:

| location of a point on corrected bodies | location of a point on resultant body |
|---|---|
| $c_1 = R_9; A_{10}$ | $R_{(9 \cup 10)}$ |
| $c_1 = R_{(9 \cup 10)}; A_{11}$ | $Ⓡ_{((9 \cup 10)\ 11)}$ |
| $c_2 = R_{10}; I_9$ | $I_{(9 \cup 10)}$ |
| $c_2 = I_{(9 \cup 10)}; A_{11}$ | $I_{((9 \cup 10)\ 11)}$ |
| $c_3 = I_9; I_{10}$ | $I_{(9 \cup 10)}$ |
| $c_3 = R_{11}; I_{(9 \cup 10)}$ | $Ⓡ_{(11\ (9 \cup 10))}$ |
| $c_4 = R_{10}; I_9$ | $I_{(9 \cup 10)}$ |
| $c_4 = I_{(9 \cup 10)}; I_{11}$ | $I_{((9 \cup 10)\ 11)}$ |
| $c_5 = R_9; A_{10}$ | $R_{(9 \cup 10)}$ |
| $c_5 = R_{(9 \cup 10)}; I_{11}$ | $I_{((9 \cup 10)\ 11)}$ |
| $c_6 = A_9; A_{10}$ | $A_{(9 \cup 10)}$ |

| location of a point on corrected bodies | location of a point on resultant body |
| --- | --- |
| $c_6 = R_{11}; A_{(9 \cup 10)}$ | $A_{((9 \cup 10)\ 11)}$ |

Accordingly, in auxiliary line c the peripheral points $c_1$ and $c_3$ are valid cutter path points.

For auxiliary line d, the following observation applies:

| location of a point on corrected bodies | location of a point on resultant body |
| --- | --- |
| $d_1 = R_{10}; A_9$ | $R_{(10 \cup 9)}$ |
| $d_1 = R_{(10 \cup 9)}; A_{11}$ | $®_{((10 \cup 9)\ 11)}$ |
| $d_2 = A_9; I_{10}$ | $I_{(9 \cup 10)}$ |
| $d_2 = R_{11}; I_{(10 \cup 9)}$ | $®_{(11\ (9 \cup 10))}$ |
| $d_3 = R_{10}; A_9$ | $R_{(10 \cup 9)}$ |
| $d_3 = R_{(10 \cup 9)}; I_{11}$ | $I_{(11(\ (10 \cup 9))}$ |
| $d_4 = A_9; A_{10}$ | $A_{(9 \cup 10)}$ |
| $d_4 = R_{11}; A_{(10 \cup 9)}$ | $A_{((9 \cup 10)\ 11)}$ |

Upon observing the more heavily drawn boundary line of workpiece 8, it is seen that all the peripheral points $a_1$, $a_2$, $b_1$, $b_2$, $c_1$, $c_3$, $d_1$ and $d_2$, recognized as valid points, are located on the corrected contour 8', or in other words equidistantly from the workpiece contour 8, the distance of which corresponds to the radius of the spherical cutter.

Figure 2:
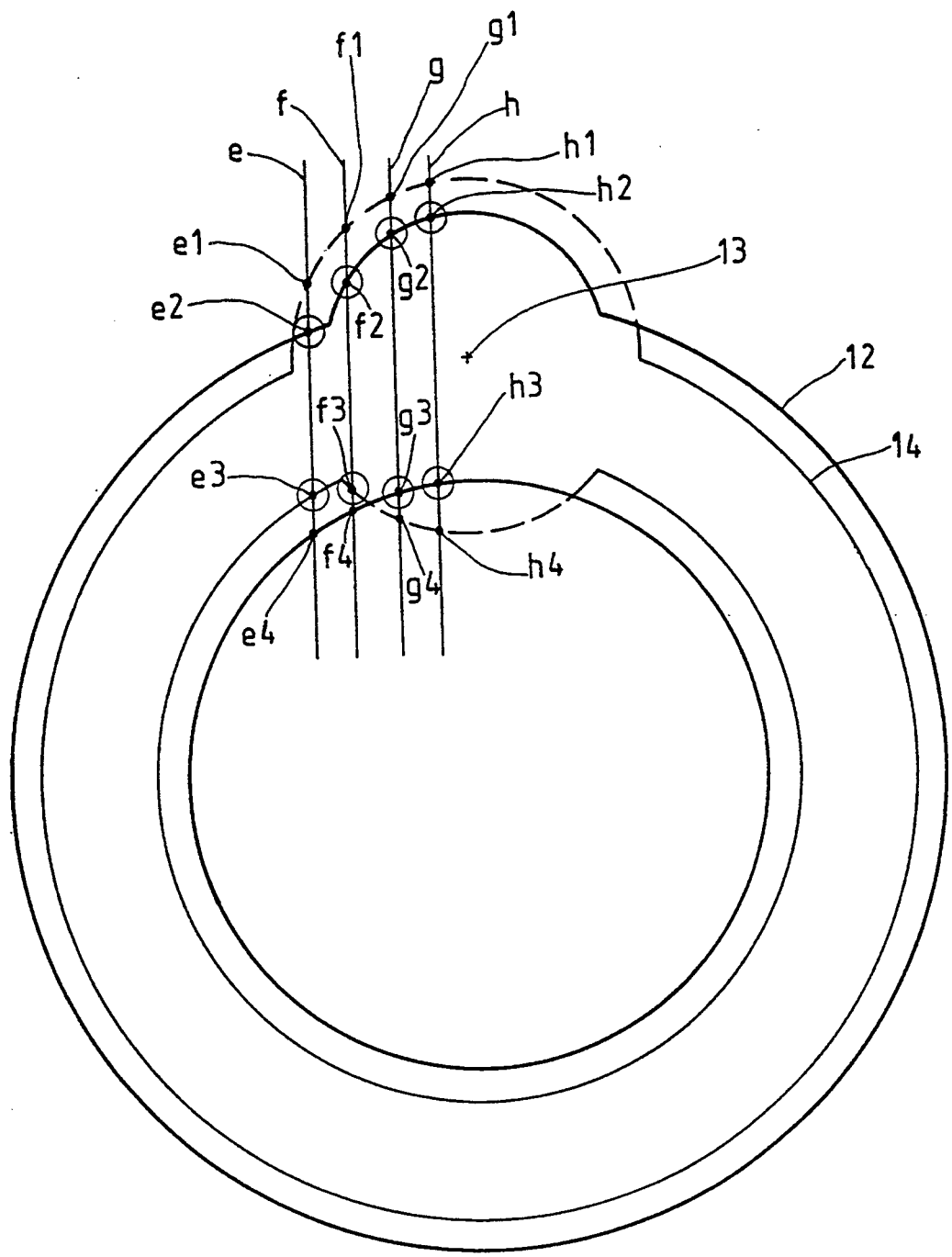
FIG. 2 is a plan view of a milling cutter path for a staggered depth workpiece.

FIG. 2 is a plan view of a milling cutter path wherein a section through a workpiece is shown with so-called staggered depth. A large circular ring 12 defines a torus of semicircular cross section, that extends into the depth of the plane of the drawing. The torus 12 is intersected by a cone in the upper part of FIG. 2, the cone extending out of the plane of the drawing and its tip being marked symbolically by a point 13.

In this example, ascertaining the valid peripheral points using the same set theory principles described above with respect to FIG. 1. Special considerations apply to machining done in layers. These special considerations arise because of the depth layering required, otherwise the principles of the set theory operations apply as described above. The torus contour 12 has a layer 14 lower than the remaining layer forming contour 12. The machining operation always begins by machining the uppermost layer of a workpiece blank and proceeds layer by layer downward. A contour for the uppermost layer must not be infringed upon by a contour located farther down, otherwise the uppermost layer contour would have to be altered to accommodate the lower contour.

For this reason, the uppermost layer forms a kind of mask, which must be taken into account in all the ensuing peripheral point observations.

Upon each successive layer, accordingly, only points that are located inside or on the periphery of the instantaneous surface and inside or on the periphery of the surface (mask) located above it are allowed, because otherwise the layer above would be altered by the layer below.

To ascertain the valid peripheral points, a sufficiently close matrix of auxiliary lines e, f, g, h is again placed over the intersection surface as described above with respect to FIG. 1. With the aid of the set operations, the valid peripheral points e2, e3; f2, f3; g2, g3; h2, h3 are ascertained from the intersection points with the auxiliary lines e, f, g, h.

All the valid peripheral points e2, e3, f2, f3, g2, g3, h2 and h3 are stored in memory in a list, with an order relation, for example ascending order, defined by the auxiliary lines e, f, g, h. For every auxiliary line e, f, g, h, not only are the points of the current layer 14 that are valid by the union set algorithm known, but also the peripheral points of the mask 12 located above it.

To find out the valid points, the points of auxiliary lines that are located one above the other must be put in relation to one another.

Since the points of an auxiliary line are put in an ascending order, the connections of two successive points alternatingly pass through inner and outer regions of the current layer 14.

Valid peripheral points are either points of the current layer 14 that are located in inner regions of the mask 12, or peripheral points of the mask 12 that are located in inner regions of the current layer 14.

The "intersection set" for the intersection lines of contours 12 and 14 is formed by set theory.

Analogously to the description of the first exemplary embodiment, the following applies: Auxiliary line e intersects the contour 14 (current layer) at point $e_1$.

The following symbols and their definitions are used in the tables:

$R_i$ = peripheral point located on a contour of layer i
$I_i$ = point located inside contour of layer i
$A_i$ = point located outside contour of layer i
$R_{(12 \cup 14)}$ = peripheral point located on the union of the contours of layers 12 and 14
$R_{(12 \cap 14)}$ = valid peripheral point located in the intersection of the contours of layers 12 and 14.

Although $e_1$ is a peripheral point of 14 ($R_{14}$), it is located outside of the mask 12 ($A_{12}$), and accordingly $e_1$ is not a valid peripheral point.

Point $e_2$ is a peripheral point of mask 12 ($R_{12}$) and is located inside the current layer 14 ($I_{14}$), and so $e_2$ is valid.

Point $e_3$ is located inside the mask 12 ($I_{12}$) and inside the current layer 14 ($I_{14}$), so $e_3$ is also valid.

Point $e_4$ is a peripheral point of the mask 12 ($R_{12}$) that is located outside of the current layer 14 ($A_{14}$), and so it is not valid.

The following table explains the location of points on auxiliary line f.

| location of the point on contours 12 and 14 | location of point on resultant figure |
| --- | --- |
| $f_1 = R_{14}; A_{12}$ | $R_{(14 \cup 12)}$ |
| $f_2 = R_{12}; I_{14}$ | $®_{(12 \cap 14)}$ |
| $f_3 = R_{14}; I_{12}$ | $®_{(14 \cap 12)}$ |
| $f_4 = R_{12}; A_{14}$ | $R_{(12 \cup 14)}$ |

Points $f_2$ and $f_3$ are accordingly valid peripheral points.

The following table explains the location of points on auxiliary line g.

| location of the point on contours 12 and 14 | location of point on resultant figure |
| --- | --- |
| $g_1 = R_{14}; A_{12}$ | $R_{(14 \cup 12)}$ |
| $g_2 = R_{12}; I_{14}$ | $®_{(12 \cap 14)}$ |
| $g_3 = R_{12}; I_{14}$ | $®_{(12 \cap 14)}$ |
| $g_4 = R_{14}; A_{12}$ | $R_{(12 \cup 14)}$ |

Points $g_2$ and $g_3$ are accordingly valid peripheral points.

The following table explains the location of points on auxiliary line h.

| location of the point on contours 12 and 14 | location of point on resultant figure |
|---|---|
| $h_1 = R_{14}; A_{12}$ | $R_{(14 \cup 12)}$ |
| $h_2 = R_{12}; I_{14}$ | $®_{(12 \cap 14)}$ |
| $h_3 = R_{12}; I_{14}$ | $®_{(12 \cap 14)}$ |
| $h_4 = R_{14}; A_{12}$ | $R_{(14 \cup 12)}$ |

Accordingly, points $h_2$ and $h_3$ are valid peripheral points.

A flow chart in the form of a NASSI-Shneider diagram is included in copending case 56/234 U.S. Pat. No. 5,295,075 "Method and Apparatus for Machining Workpieces with Numerically Controlled Machines" by Klaus-Dieter Körner which is incorporated herein by reference. Portions of that flow chart marked "II" are directed specifically to the present invention and are incorporated herein.

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. A method for machining a workpiece into a desired part using numerical control comprising the steps of:
   defining the desired part as a set theory equation linking one or more simple bodies;
   calculating a line contour representing the intersection between the simple bodies and a machining plane;
   determining intersection points between the line contour and a series of lines intersecting said line contour;
   determining whether each intersection point satisfies the same set theory equation as in the initial step;
   labelling those intersection points that satisfy the set theory equation as valid peripheral points on said contour;
   machining the workpiece along a path containing said valid peripheral points to create the desired part.

2. A method according to claim 1 wherein said series of lines are parallel.

3. A method according to claim 1 wherein said series of lines are equidistantly spaced from one another.

4. A method according to claim 3 wherein the spacing of the series of lines is determined by the desired resolution of the machining path.

5. A method according to claim 1 further including the step of correcting the simple bodies by a radius equal to the radius of a tool used for machining the workpiece.

6. A method for machining a workpiece into a desired part using numerical control comprising the steps of:
   defining the desired part as a set theory equation linking one or more simple bodies, wherein said bodies may be positive or negative;
   correcting the simple bodies by a radius equal to the radius of a tool used to machine the workpiece;
   calculating a line contour representing the intersection between the corrected simple bodies and a machining plane;
   determining intersection points between the line contour and a series of lines intersecting said line contour;
   determining whether each intersection point satisfies the same set theory equation as in the initial step;
   labelling those intersection points that satisfy the set theory equation as valid peripheral points on said contour; and
   machining the workpiece along a path containing said valid peripheral points to create the desired part.

7. A method according to claim 6 wherein the step of correcting the simple bodies includes increasing the periphery of the simple body if the body is positive and decreasing the periphery of the body if the body is negative.

8. A method according to claim 6 wherein said series of lines are parallel.

9. A method according to claim 6 wherein said series of lines are equidistantly spaced from one another.

10. A method according to claim 13 wherein the spacing of the series of lines is determined by the desired resolution of the machining path.

11. A method for machining a workpiece into a desired part comprising the steps of:
    defining the desired part by linking at least two simple bodies using a set theory equation;
    generating a line contour by intersecting the simple bodies with a machining plane;
    creating points of intersection between the line contour and a series of lines intersecting said line contour;
    determining which points of intersection are valid by determining whether the point satisfies the same set theory equation as in the initial step; and
    machining the workpiece along a path containing the valid peripheral points to create the desired part.

12. A method according to claim 11 further comprising the step of machining the workpiece includes machining the workpiece for each machining plane starting at the top of the workpiece and machining plane by plane to the bottom of the workpiece wherein the valid points of intersection determined for a current plane must be within the contour defined by the valid points of planes above the current plane.

13. A method according to claim 11 wherein the steps of defining the desired part and generating a line contour are carried out with simple bodies which have been corrected by a radius equal to the radius of a tool used to machine the workpiece.

14. An apparatus for machining a workpiece into a desired part comprising:
    a movable tool to cut the workpiece along a calculated path;
    a control system sending signals to said tool so as to move said tool along said calculated path;
    said control system further comprising a numerically controlled machine for running a routine for defining the desired part as a set theory equation linking one or more simple bodies, calculating a line contour representing the intersection between the simple bodies and a machining plane, determining intersection points between the line contour and a series of lines intersecting said line contour, determining whether each intersection point satisfies the same set theory equation as in the initial step and labelling those intersection points that satisfy the set theory equation as valid peripheral points on said contour, the valid peripheral points defining the calculated path.

15. An apparatus according to claim 14 wherein said series of lines are parallel.

16. An apparatus according to claim 14 wherein said series of lines are equidistantly spaced from one another.

17. An apparatus according to claim 16 wherein the spacing of the series of lines is determined by the desired resolution of the machining path.

18. A method according to claim 14 wherein the routine includes the step of correcting the simple bodies by a radius equal to the radius of a tool used for machining the workpiece.

* * * * *

UNITED STATES PATENT AND TRADEMARK OFFICE
CERTIFICATE OF CORRECTION

PATENT NO. : 5,353,232
DATED : October 4, 1994
INVENTOR(S) : Norbert Vollmayr

It is certified that error appears in the above-indentified patent and that said Letters Patent is hereby corrected as shown below:

```
Column 8, line 20
In Claim 10, line 1, delete "13" and substitute --9--.
```

Signed and Sealed this

Thirteenth Day of June, 1995

Attest:

BRUCE LEHMAN

Attesting Officer     Commissioner of Patents and Trademarks